(12) United States Patent
Peng et al.

(10) Patent No.: US 10,704,159 B2
(45) Date of Patent: Jul. 7, 2020

(54) METHOD OF METAL POLISHING AND OXIDATION FILM PROCESS AND SYSTEM THEREOF

(71) Applicants: Kun Cheng Peng, New Taipei (TW); Bo Yan Su, New Taipei (TW); Wei Chun Wang, New Taipei (TW); Chun Ying Lee, New Taipei (TW)

(72) Inventors: Kun Cheng Peng, New Taipei (TW); Bo Yan Su, New Taipei (TW); Wei Chun Wang, New Taipei (TW); Chun Ying Lee, New Taipei (TW)

( * ) Notice: Subject to any disclaimer, the term of this patent is extended or adjusted under 35 U.S.C. 154(b) by 0 days.

(21) Appl. No.: 15/425,143

(22) Filed: Feb. 6, 2017

(65) Prior Publication Data

US 2019/0382912 A1 Dec. 19, 2019

(51) Int. Cl.
*C25F 3/16* (2006.01)
*C25F 5/00* (2006.01)
*C25F 7/00* (2006.01)
*B23H 3/02* (2006.01)

(52) U.S. Cl.
CPC ............. *C25F 3/16* (2013.01); *C25F 5/00* (2013.01); *C25F 7/00* (2013.01); *B23H 3/02* (2013.01)

(58) Field of Classification Search
CPC ............................... C25D 11/06; C25D 11/08
See application file for complete search history.

(56) References Cited

U.S. PATENT DOCUMENTS 4,130,493 A * 12/1978 Inoue .................. C10M 173/02
219/69.14

FOREIGN PATENT DOCUMENTS

CN 203782266 U * 8/2014

* cited by examiner

*Primary Examiner* — Nicholas A Smith
(74) *Attorney, Agent, or Firm* — Sinorica, LLC

(57) ABSTRACT

The present invention is a method of metal polishing and oxidation film process applied on a metal workpiece. The process comprises (a) providing the metallic workpiece in an electrolysis polishing liquid; (b) a temperature control device controlling a liquid temperature of the electrolysis polishing liquid; (c) a voltage supply device to exercising an operating voltage between the metallic workpiece and the electrolysis polishing liquid; (d) polishing the surface of the metallic workpiece and forming an oxidation layer by regulating the temperature control device and the voltage supply device; and (e) determining a film thickness of the oxidation layer formed on the metallic workpiece according to an operation time, wherein the film thickness is related to a roughness and a color displayed on the metallic workpiece. The metallic workpiece may be dyed together during the polishing process without adding any dyes. The present invention further provides a system of alloy oxidation film process.

9 Claims, 6 Drawing Sheets

METHOD OF METAL POLISHING AND OXIDATION FILM PROCESS AND SYSTEM THEREOF

FIELD OF THE INVENTION

The present invention relates to the technical field of metal surface treatment, particularly a method and system of metal polishing and oxidation film process that executes polishing and dyeing.

BACKGROUND OF THE INVENTION

The major function of polishing technology is to reduce the roughness of a workpiece (particularly for metallic workpiece). The major function of dyeing technology is to form a cover layer on a workpiece to filter the electromagnetic waves in a natural light and generate a specific color then.

The polishing technology is majorly applied in metalworking, precision machinery and optical industry. The surface of a workpiece after polishing will be smooth and have great reflection effect. The polishing technology can be categorized into physical polishing and chemical polishing. The principle of chemical polishing is to set the workpiece in a polishing electrolyte and to exercise a voltage and a current such that an anodic reaction occurs on the surface of the workpiece for planarization, polish and passivation.

The dyeing technology is majorly applied in metalworking, precision machinery and optical industry as well. The traditional dyeing process is to form an oxidized film through an anodic oxidation reaction on the workpiece. Because the oxidized film has lots of perforation and strong capability of absorption, a variety of colors may be dyed by adding dyes.

However, the function of polishing electrolyte will gradually degrade with time and extent of usage to be unusable then. Consequently, it is necessary to replace the polishing electrolyte, but the replaced polishing electrolyte may result in environmental pollution if no special treatment is applied because it contains pollutants such as metallic ions. Furthermore, such special treatment may increase the processing cost a lot. In dyeing technology, a variety of dyes has to be added additionally to form a variety of colors.

In views of the abovementioned, a method and system of metal polishing and oxidation film process is proposed in the present invention to resolve the deficiency of the prior art.

SUMMARY OF THE INVENTION

The first objective of the present invention is to provide a method of metal polishing and oxidation film process, a metallic workpiece is configured to a liquid mixture of inorganic acid and bio-bacteria, and altering the surface property of the metallic workpiece (e.g. hardness, corrosion resistance and flatness etc.) by setting a liquid temperature, an operating time and an operating voltage.

The second objective of the present invention is to provide a system of metal polishing and oxidation film process applied on the metallic workpiece for polishing and dyeing.

The third objective of the present invention is to control the liquid mixture of inorganic acid and bio-bacteria at a low temperature (temperature is less than 5 Celsius degree) and a high voltage (a voltage difference between a positive and a negative electrodes is more or equal to 15 volt) for polishing and dyeing in accordance with the abovementioned system of metal polishing and oxidation film process.

The forth objective of the present invention is to further add a glycerol such that a lipid as cellular membrane is formed to improve the effect of polishing in accordance with the abovementioned system of metal polishing and oxidation film process.

The fifth objective of the present invention is to use a phosphoric acid as the inorganic acid along with glycerol and bio-bacteria to form phospholipid in accordance with the abovementioned system of metal polishing and oxidation film process.

The sixth objective of the present invention is in accordance with the abovementioned system of metal polishing and oxidation film process wherein the bio-bacteria is yeast, Shirota, photosynthetic bacteria, lactobacillus, bacilli, fermented dairy product and the combinations thereof.

The seventh objective of the present invention is to determine whether bio-bacteria have to be further added by detecting the electrical property (such as electrical resistance) of the electrolyte of metal polishing and oxidation film process through a fixed voltage or a fixed current for changing the electrical properties in accordance with the abovementioned system of metal polishing and oxidation film process.

To reach the abovementioned and other objectives, the present invention provides a method of metal polishing and oxidation film process applied on a metallic workpiece. The method of metal polishing and oxidation film process comprises a step (a), providing the metallic workpiece in a polishing electrolyte, which comprises an inorganic acid and a bio-bacteria; step (b), controlling a liquid temperature of the polishing electrolyte by a temperature control device; step (c), exercising an operating voltage on the polishing electrolyte by a voltage supply device; step (d), forming an oxidation layer on the metallic workpiece by regulating the temperature control device and the voltage supply device, wherein the polishing electrolyte is operated under a condition that the liquid temperature is less or equal to 5° C. and the operating voltage is more or equal to 15 V; and step (e), determining a film thickness of the oxidation layer on the metallic workpiece according to an operating time, wherein the film thickness is related to the roughness and color displayed on the metallic workpiece.

To reach the abovementioned and other objectives, the present invention provides a system of metal polishing and oxidation film process applied on a metallic workpiece. The system of metal polishing and oxidation film process comprises a first electrode, a second electrode, a liquid tank and a temperature control device. The first electrode is connected to an external positive voltage, and the second electrode is connected to an external negative voltage, wherein the voltage difference between the external positive voltage and the external negative voltage is more or equal to 15 V. The first electrode and the second electrode are provided in the liquid. A polishing electrolyte is injected into the liquid tank to contact at least part of the metallic workpiece. The temperature control device is configured to a side of the liquid tank. The temperature control device is provided to regulate a liquid temperature of the polishing electrolyte, wherein the liquid temperature is less or equal to 5 Celsius degree, and wherein a film thickness of an oxidation layer on the metallic workpiece is determined by regulating the liquid temperature, the external positive voltage and the external negative voltage within a time.

Compared to prior art, the method and system of metal polishing and oxidation film process in the present invention may avoid the influence on the environments due to using a green and non-toxic polishing electrolyte comprising an inorganic acid and bio-bacteria. Furthermore, since the characteristics of the polishing electrolyte may be determined by the used bio-bacteria, the electrical property of the polishing electrolyte may be reset by increasing the amount of the bio-bacteria, using different strains of bio-bacteria and adjusting the amount of strains for reuse. That is, the function of a polishing electrolyte in loss of activity may be restored only by increasing the concentration (or amount) of the bio-bacteria without replacement. Besides, polishing and dyeing may be carried out together by regulating time, voltage and temperature without additionally adding dye.

DETAILED DESCRIPTION OF THE PREFERRED EMBODIMENTS

In order to fully comprehend the objectives, features and efficacy of the present invention, a detailed description is described by the following substantial embodiments in conjunction with the accompanying drawings. The description is as below.

Figure 1:
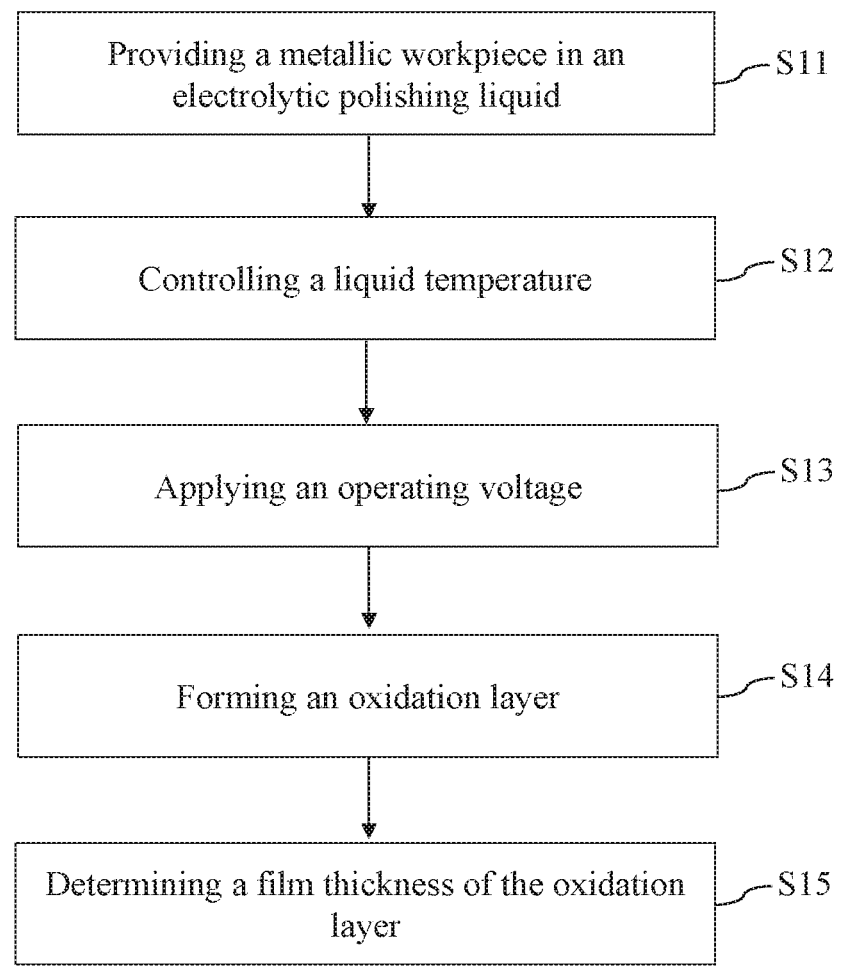
FIG. 1 is a flow chart of the method of metal polishing and oxidation film process of a first embodiment in the present invention.

Refer to FIG. 1, which is a flow chart of the method of metal polishing and oxidation film process of a first embodiment in the present invention. The method of metal polishing and oxidation film process is applied on a metallic workpiece. The method starts from step S11, which is to provide a metallic workpiece in a polishing electrolyte, wherein the polishing electrolyte comprises an inorganic acid and bio-bacteria.

Step S12 is to control a liquid temperature of the polishing electrolyte by a temperature control device.

Step S13 is to apply an operating voltage to the polishing electrolyte by a voltage supply device.

Step S14 is to form an oxidation layer on the metallic workpiece by regulating the temperature control device and the voltage device, wherein the polishing electrolyte is operated at a liquid temperature is less or equal to 5° C. and the operating voltage is more or equal to 15 V.

Step S15 is to determine a film thickness of the oxidation layer formed on the metallic workpiece, wherein the film thickness is related to roughness and color displayed by the metallic workpiece. The roughness is a result after a surface treatment process carried out on the metallic workpiece such as pitting, coarsening, etching and polishing etc. The surface processing procedure may change the surface property of the metallic workpiece, such as hardness, corrosion resistance, flatness etc.

Figure 2:
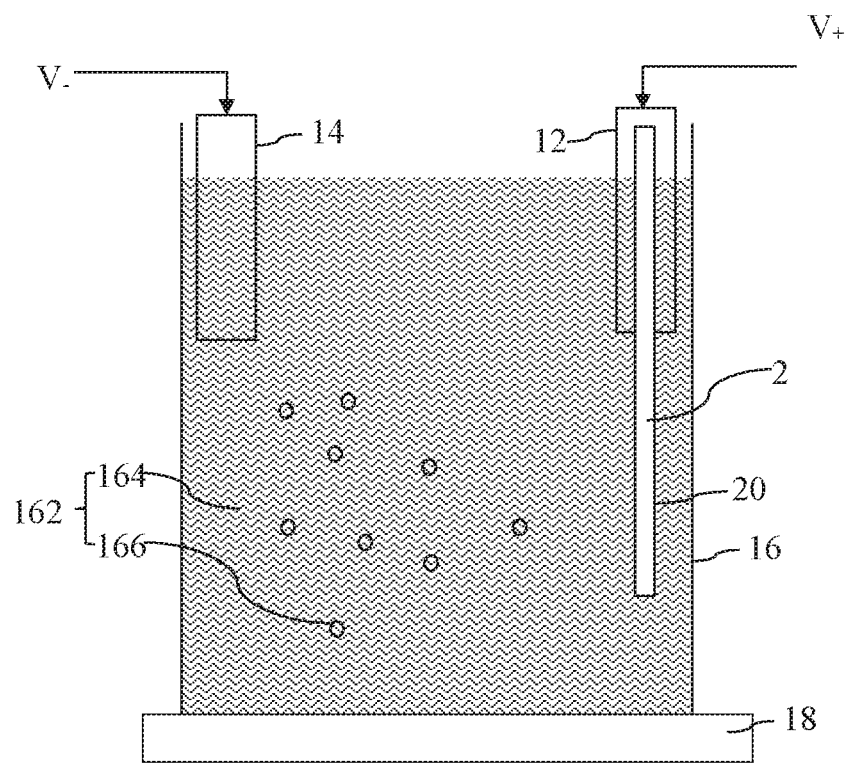
FIG. 2 is a block diagram of the system of metal polishing and oxidation film process of a second embodiment in the present invention.

Refer to FIG. 2, which is the block diagram of the system of metal polishing and oxidation film process of a second embodiment in the present invention. Method of metal polishing and oxidation film process 10 is applied on a metallic workpiece 2, wherein the metallic workpiece 2 may be, for instance, stainless steel, high-carbon steel, low-carbon steel, copper, aluminum alloys, brass, magnesium alloys, aluminum-magnesium (Al—Mg) alloys, etc.

The system of metal polishing and oxidation film process 10 comprises a first electrode 12, a second electrode 14, a liquid tank 16 and a temperature control device 18.

The first electrode 12 (which is also called positive terminal) is connected to an external positive voltage $V_+$, which may be generated from a power supply (not shown in figure).

The second electrode 14 (which is also called negative terminal) is connected to an external negative voltage $V_-$, which may be generated from a power supply (not shown in figure) as well, wherein the voltage difference between the external positive voltage $V_+$ and the external negative voltage $V_-$ is more or equal to 15 V. In another embodiment, the external positive voltage may be controlled within a range from 15 V to 60 V.

The liquid tank 16 is provided with the first electrode 12 and the second electrode 14. A polishing electrolyte 162 is injected into the liquid tank 16 to contact at least part of the metallic workpiece 2. In this embodiment, the metallic workpiece 2 is immersed in the polishing electrolyte 162, and one end of the metallic workpiece 2 is connected to the first electrode 12 (which is called anode terminal as well). While voltage operation is executed, the external positive voltage is exercised on the first electrode 12 and the external negative voltage with opposite polarity to that on the first electrode 12 or a ground voltage is exercised on the second electrode 14. By regulating the positive voltage $V_+$ or negative voltage $V_-$, coarsening can be performed on the metallic workpiece 2 with a voltage (especial in high voltage) and planarization can be performed on the metallic workpiece 2 with a voltage (especial in low voltage).

The liquid tank 16 is provided with the first electrode 12 and the second electrode 14. A polishing electrolyte 162 is injected into liquid tank 16 to contact at least part of the metallic workpiece 2.

The above-mentioned polishing electrolyte 162 comprises an inorganic acid 164 and bio-bacteria 166. The bio-bacteria 166 is added into the inorganic acid 164, wherein a range of a volume ratio of inorganic acid 164 and bio-bacteria 166 is between 20:1 and 60:1.

The abovementioned inorganic acid 164 is selected from one of the groups consisting of phosphoric acid ($H_3PO_4$), hydrochloric acid (HCl), sulfuric acid ($H_2SO_4$), nitric acid ($HNO_3$), boric acid ($H_3BO_3$), hydrofluoric acid (HF), hydrobromic acid (HBr), perchloric acid ($HClO_4$) etc., and the bio-bacteria 166 may be yeast, shirota, photobio-bactirium, lactobacillus, bacilli and the combinations thereof. Besides, the bio-bacteria 166 may also be fermented dairy product such as yogurt. It is worthy to be noted that, any method of metal polishing and oxidation film process which is not mentioned herein but generated by adding bio-bacteria 166 into inorganic acid 164 are covered by the scope of the present invention.

The metallic ions released by the metallic workpiece 2 during the electrolysis process increases with the increasing cumulative number of use, resulting in the electrical property of the abovementioned polishing electrolyte 162 (such as resistance) decreases as well. In another embodiment, the resistance of the polishing electrolyte may be examined by providing a fixed voltage or a fixed current. In the mode of the fixed current, different voltage may be obtained by the product of the resistance and the fixed current, and the change in the voltage may be used to determine the change in the resistance of the polishing electrolyte 162. For example, a decrease of the voltage indicates an increase of the metallic ions, which causes a decrease of the resistance of the abovementioned polishing electrolyte. It can be inferred that the amount of the metallic ions in the abovementioned polishing electrolyte is saturated while there is no change in the voltage anymore after a period of time. The polishing electrolyte 162 after saturation cannot work on the metallic workpiece 2 effectively.

In this embodiment, while the polishing electrolyte 162 cannot work on the metallic workpiece 2, inorganic acid 164 may be further added to dilute the concentration of the metallic ions such that the polishing electrolyte 162 may still affect the metallic workpiece 2 continuously and effectively. Therefore, the polishing electrolyte 162 of the present invention obviously resolve the disadvantage of traditional polishing electrolyte, which is unusable and can be discarded only.

In another embodiment, besides the inorganic acid 164 and bio-bacteria 166 comprised in the polishing electrolyte 162, glycerol ($C_3H_8O_3$) may be added additionally as well (not shown in the figure). Glycerol and inorganic acid 164 form complex lipid, wherein a range of a volume ratio of inorganic acid 164 and glycerol is between 4:1 and 3:1. It is worthy to note that glycerol may not be involved with the electrolysis process but the objective of using glycerol is to dilute the amount of metallic ions.

In another embodiment, the inorganic acid 164 may be phosphoric acid such that phospholipid forms in the polishing electrolyte 162, wherein the phospholipid means a lipid comprising phosphoric acid and it is a major composition in the constitution of a biological membrane.

In another embodiment, besides the inorganic acid 164 and the bio-bacteria 166 comprised in the polishing electrolyte 162, chitin $((C_8H_{13}O_5N)_n)$ may be added additionally to further change the surface property of the metallic workpiece 2.

In general, because of the waterless reaction during the electrolysis and polishing process of the present invention, the liquid temperature barely increases after electrolyzing and polishing for a period of time. The polishing electrolyte of the present invention is unlike the traditional water-based polishing liquid which generates heat during the polishing process and makes the water-based polishing liquid degrading. Furthermore, the inorganic acid 164 reacts with the bonding of the bio-bacteria 166, but the glycerol is not involved with the reaction.

The temperature control device 18 is provided at the bottom of the liquid tank 16. In other embodiments, the temperature control device 18 may be provided at one side of the liquid tank 16 rather than at the bottom. The temperature control device 18 is capable of regulating a liquid temperature of the polishing electrolyte 162 in the liquid tank 16, wherein the liquid temperature is less or equal the room temperature or 5° C. lower. For example, the temperature control device 18 may be, for example, an ice machine to generate the liquid temperature of said low temperature.

Within a time, a film thickness of an oxidation layer 20 on the metallic workpiece 2 may be determined by setting the liquid temperature, the positive voltage and the negative voltage. The film thickness is positively related to the displayed color, wherein the oxidation layer 20 is a non-conductive, a non-crystalline material, or crystalline material, with a property of high hardness.

For instance, the formation speed (which is also called densification and densification relates to the color of the metallic workpiece 2) of the oxidation layer 20 is determined by regulating the voltage difference between the external positive voltage $V_+$ and the external negative voltage $V_-$, and the chemical reaction time may be reduced via the liquid temperature control.

Figure 3:
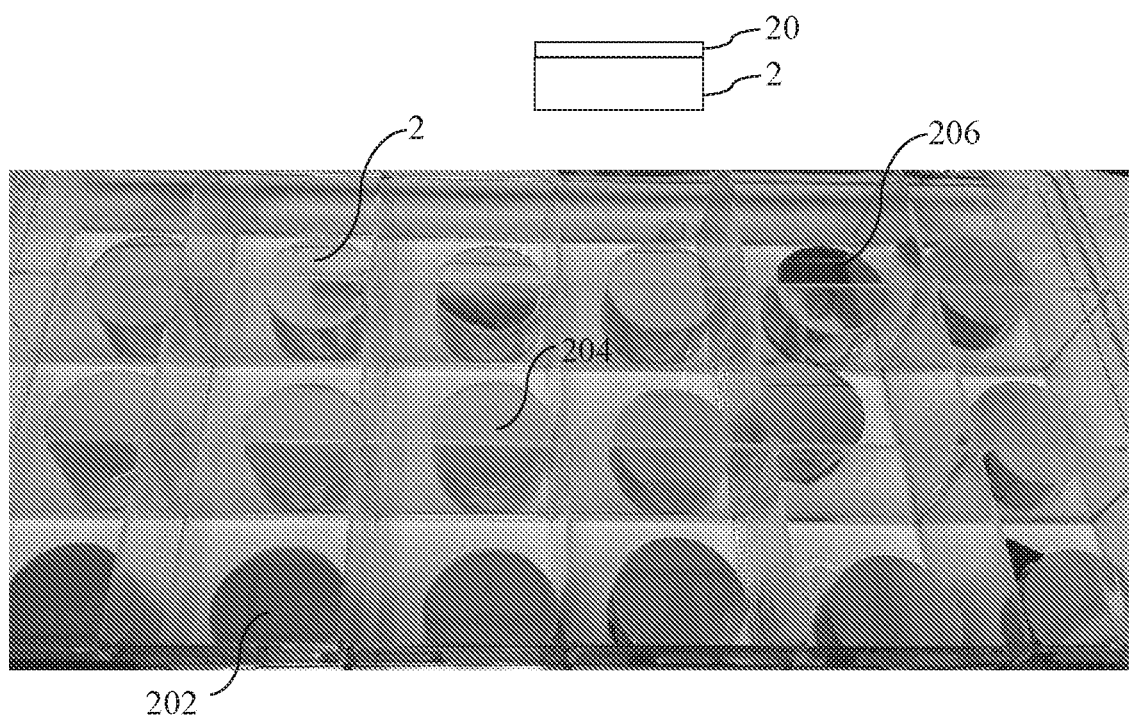
FIG. 3 is an end-product drawing illustrating the metallic workpiece in FIG. 2 of the present invention.

Refer to FIG. 3 together, which illustrates the experimental result of the metallic workpiece 2 in FIG. 2. In FIG. 3, oxidation layers 20 with different film thickness are formed on the metallic workpiece 2 according to different time, liquid temperature, external positive voltage and external negative voltage applied. It is derived from FIG. 3 that the oxidation layers 20 on the metallic workpiece 2 may be a transparent 202, a matte 204 or a glossy 206.

Figure 4:
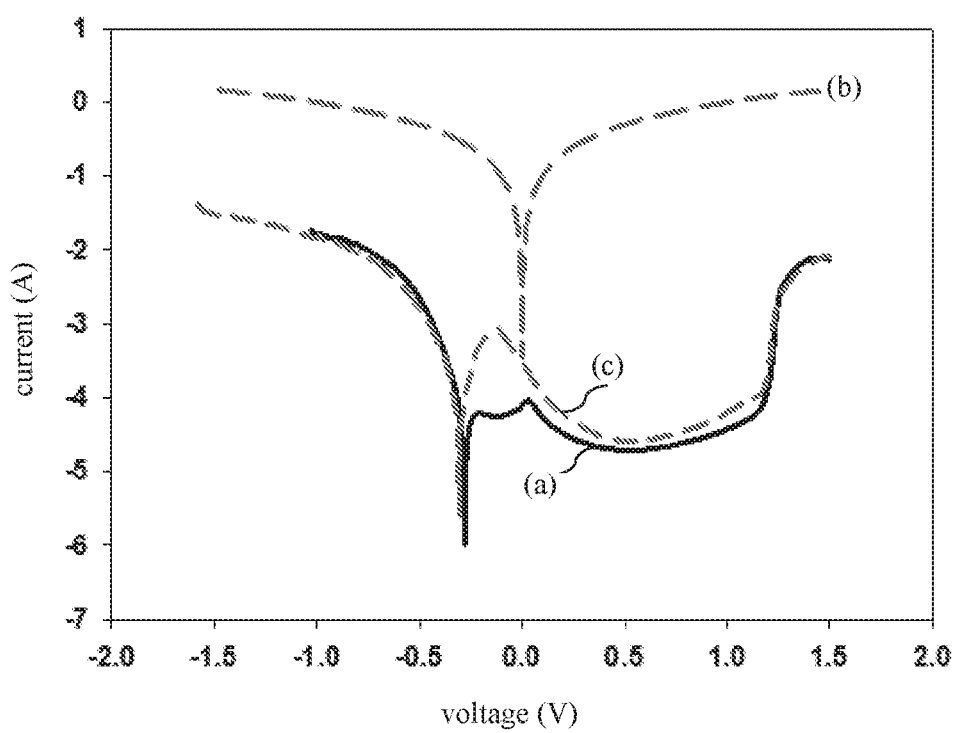
FIG. 4 is a polarization diagram illustrating the characteristics of the voltage to the current of the metallic workpiece in FIG. 2 of the present invention.

Refer to FIG. 4, which is the curve diagram that illustrates the characteristics of the applied voltage on the metallic workpiece versus the measured electric current. In FIG. 4, the test condition of the metallic workpiece 2 is initial voltage of −1.5 V, final voltage of 1.5 V and a scanning rate of 3 mV/S. The horizontal axis in the characteristic curve diagram is voltage (V) and the vertical axis is current (A), wherein the scale of the current is logarithmic. Three different kinds of bio-bacteria 166 are individually used as the basis for the polishing electrolyte 162, wherein the bio-bacteria 166 are (a) yeast, photosynthetic bacteria, lactobacillus, (b) commercial yogurt and (c) commercial Shirota.

Figure 5:
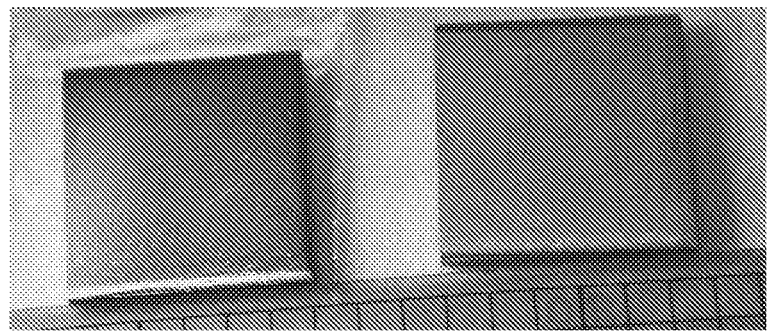
FIG. 5(a) to 5(c) are end-product photographs illustrating the metallic workpiece in FIG. 2 of the present invention.
Figure 5:
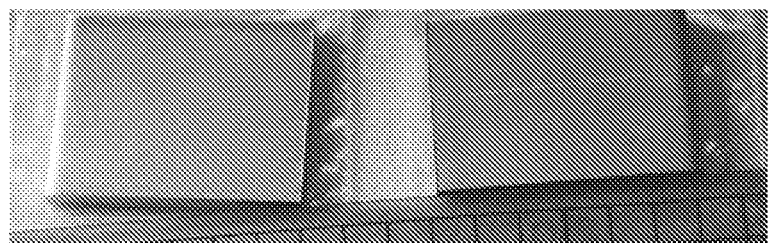
Figure 5:
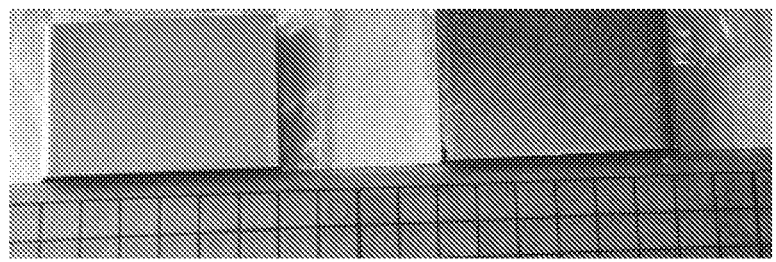

Refer to FIG. 5(a) to 5(c), which are the experimental end-product photographs that illustrate the metallic workpiece in FIG. 2 of the present invention. FIG. 5(a) is the metallic workpiece 2 with material of stainless steel, which is affected by glycerol, phosphoric acid and bio-bacteria 166. The right and left figures are the stainless steel after and before affected by the present invention, respectively. FIG. 5(b) is the metallic workpiece 2 with material of stainless steel, which is affected by glycerol, phosphoric acid and Shirota. The right and left figures are stainless steel both affected by the present invention and the only difference lies in different operating voltage. FIG. 5(c) is the metallic workpiece 2 with material of stainless steel, which is affected by glycerol, phosphoric acid and yogurt. The right and left figures are stainless steel both affected by the present invention and the only difference lies in using different strains of yogurt.

Consequently, different results of surface treatment may be generated by adjusting parameters such as the kinds of the strains of the bio-bacteria 166, the electrolyzing time, the electrolyzing voltage and the electrolyzing current according to the actual demands.

Figure 6:
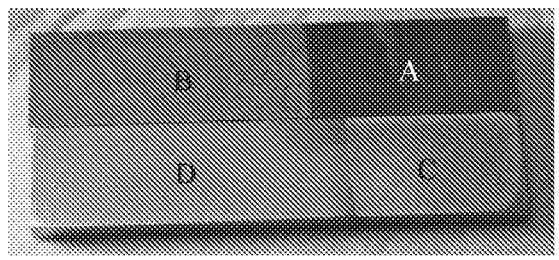
FIG. 6(a) to 6(f) are end-product photographs illustrating the metallic workpiece in FIG. 2 of the present invention after polishing
Figure 6:
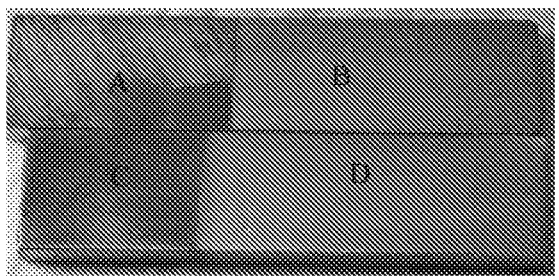
Figure 6:
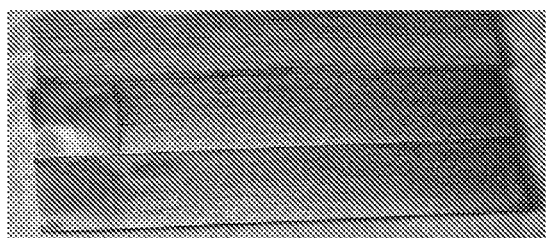
Figure 6:
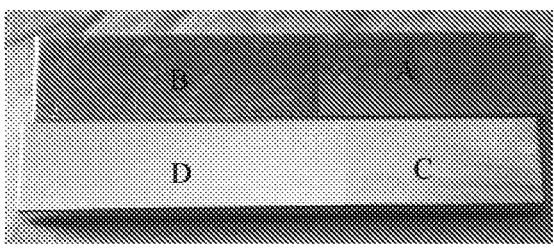
Figure 6:
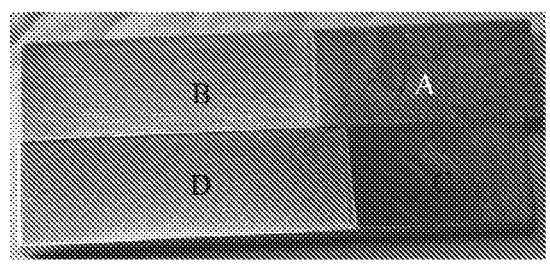
Figure 6:
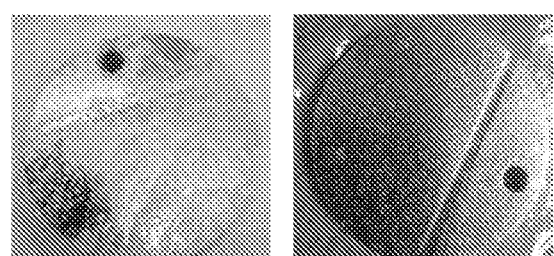

Refer to FIG. 6(a) to 6(f), which are the experimental end-product photographs that illustrate the metallic workpiece in FIG. 2 of the present invention after polishing. FIG. 6(a) is the metallic workpiece 2 with material of high-carbon steel, which is affected by glycerol, phosphoric acid and bio-bacteria 166, wherein the surface treatment area on the high-carbon steel is divided into four regions A, B, C, D, wherein region A is the pristine surface without treatment, region B is the coarsened surface with electrolyzed treatment, region C is the sandpaper polished surface and region D is the electrolyzed coarsening surface on sandpaper polished surface, respectively. FIG. 6(b) is the metallic workpiece 2 with material of low-carbon steel, which is affected by glycerol, phosphoric acid and bio-bacteria 166, wherein the surface treatment area on the low-carbon steel is divided into four regions A, B, C, D, wherein similar designations on these regions as previous example are adopted. FIG. 6(c) is the metallic workpiece 2 with material of copper, which is affected by glycerol, phosphoric acid and bio-bacteria 166, wherein the upper figure shows the state of the copper after being affected by the present invention without being mechanically polished, the middle figure is the copper after being polished by the sandpaper for 35 minutes, and lower figure is the copper after being polished by the sandpaper for 10 minutes; FIG. 6(*d*) is the metallic workpiece 2 with material of aluminum alloys, which is affected by glycerol, phosphoric acid and bio-bacteria 166, wherein the surface treatment surface on the aluminum alloys is divided into four regions A, B, C, D, wherein similar designations on these regions as FIG. 6(*a*) are adopted. FIG. 6(*e*) is the metallic workpiece 2 with material of brass, which is affected by glycerol, phosphoric acid and bio-bacteria 166, wherein the surface treatment area on the brass is divided into four regions A, B, C, D, as mentioned previously. FIG. 6(*f*) is the metallic workpiece 2 with material of magnesium alloys, which is affected by glycerol, phosphoric acid and bio-bacteria 166, wherein the right figure is the original surface and the left one is the surface after electrolyzed polishing.

The present invention is disclosed by the preferred embodiments in the aforementioned description; however, it is contemplated for one skilled at the art that the embodiments are applied only for an illustration of the present invention rather than are interpreted as a limitation for the scope of the present invention. It should be noted that the various substantial alternation or replacement equivalent to these embodiments shall be considered as being covered within the scope of the present invention. Therefore, the protection scope of the present invention shall be defined by the claims.

What is claimed is:

1. A method of metal polishing and oxidation film process applied on a metallic workpiece comprising:
    providing the metallic workpiece in an electrolysis polishing liquid, wherein the electrolysis polishing liquid comprises an inorganic acid and a bio-bacteria;
    a temperature control device controlling a liquid temperature of the electrolysis polishing liquid;
    a voltage supply device exercising an operating voltage on the electrolysis polishing liquid;
    forming an oxidation layer on the metallic workpiece by regulating the temperature control device and the voltage supply device, wherein the electrolysis polishing liquid is operated under a condition that the liquid temperature is less or equal to 5° C. and the operating voltage is more or equal to 15 V; and
    determining a film thickness of the oxidation layer formed on the metallic workpiece according to an operation time, wherein the film thickness is related to a roughness and a color displayed by the metallic workpiece.

2. A system of metal polishing and oxidation film process applied on a metallic workpiece comprising:
    a first electrode being connected to an external positive voltage;
    a second electrode being connected to an external negative voltage, wherein the voltage difference between the external positive voltage and the external negative voltage is more or equal to 15 V;
    a liquid tank providing with the first electrode and the second electrode, and an electrolysis polishing liquid injecting into the liquid tank to contact at least part of the metallic workpiece;
    a temperature control device being configured to a side of the liquid tank, and the temperature control device providing to regulate a liquid temperature of the electrolysis polishing liquid in the liquid tank, wherein the liquid temperature is less or equal to 5° C.;
    wherein a film thickness of an oxidation layer on the metallic workpiece is determined by regulating the liquid temperature, the external positive voltage and the external negative voltage within a time duration;
    wherein the electrolysis polishing liquid comprising an inorganic acid and a bio-bacteria, and a range of volume ratio of the inorganic acid to the bio-bacteria between 20:1 and 60:1.

3. The system of metal polishing and oxidation film process of claim 2, wherein the liquid temperature adjusted within a range between 5° C. to −20° C. and the voltage difference adjusted within a range between 15 V to 60 V.

4. The system of metal polishing and oxidation film process of claim 2, wherein the inorganic acid selected from one of the groups consisting of a phosphoric acid ($H_3PO_4$), a hydrochloric acid (HCl), a sulfuric acid ($H_2SO_4$), a nitric acid ($HNO_3$), a boric acid ($H_3BO_3$), a hydrofluoric acid (HF), a hydrobromic acid (HBr), and a perchloric acid ($HClO_4$).

5. The system of metal polishing and oxidation film process of claim 4 further comprising a glycerol ($C_3H_8O_3$) added into the inorganic acid to form a complex lipid.

6. The system of metal polishing and oxidation film process of claim 5, wherein a range of a volume ratio of the inorganic acid and the glycerol between 4:1 and 3:1.

7. The system of metal polishing and oxidation film process of claim 2, wherein the bio-bacteria is an yeast, a Shirota, a photosynthetic-bacteria, a *lactobacillus*, a bacilli and the combinations thereof, or a fermented dairy product.

8. The system of metal polishing and oxidation film process of claim 2 further comprising a chitin (($C_8H_{13}O_5N$)$_n$) added into the inorganic acid.

9. The system of metal polishing and oxidation film process of claim 2, wherein the inorganic acid changed the electrical properties of the metallic workpiece by one of the kind of strains of the bio-bacteria and the amount of strains.

* * * * *